United States Patent
Uchisasai et al.

(10) Patent No.: US 7,303,504 B2
(45) Date of Patent: Dec. 4, 2007

(54) POWER SWITCHOVER APPARATUS FOR A HYBRID VEHICLE

(75) Inventors: Hiroaki Uchisasai, Saitama (JP);
Yoshiaki Tsukada, Saitama (JP);
Hiroyuki Kojima, Saitama (JP);
Takashi Ozeki, Saitama (JP);
Kazuhiko Nakamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 202 days.

(21) Appl. No.: 11/168,445

(22) Filed: Jun. 29, 2005

(65) Prior Publication Data

US 2006/0030454 A1   Feb. 9, 2006

(30) Foreign Application Priority Data

Aug. 5, 2004   (JP)   ............. 2004-229414

(51) Int. Cl.
*B60W 10/04* (2006.01)
*B60W 10/10* (2006.01)

(52) U.S. Cl. .............. 477/5; 477/77; 903/930

(58) Field of Classification Search .......... 477/3, 477/5, 77; 903/930
See application file for complete search history.

(56) References Cited

U.S. PATENT DOCUMENTS

| 6,083,139 A | 7/2000 | Deguchi et al. |
|---|---|---|
| 6,283,239 B1* | 9/2001 | Tsukamoto et al. ........ 180/65.2 |
| 6,344,008 B1 | 2/2002 | Nagano et al. |
| 6,377,883 B1* | 4/2002 | Shimabukuro et al. ....... 701/51 |
| 6,491,602 B1 | 12/2002 | Höhn |
| 6,740,002 B1* | 5/2004 | Stridsberg .................... 477/14 |
| 2003/0092525 A1 | 5/2003 | Gu et al. |

FOREIGN PATENT DOCUMENTS

| EP | 0 445 873 A1 | 9/1991 |
|---|---|---|
| EP | 1 270 302 A2 | 1/2003 |
| JP | 2000-23311 A | 1/2000 |
| JP | 2000-324610 A | 11/2000 |
| WO | WO-2004/054836 A1 | 7/2004 |

\* cited by examiner

*Primary Examiner*—Sherry Estremsky
*Assistant Examiner*—Edwin A Young
(74) *Attorney, Agent, or Firm*—Birch, Stewart, Kolasch & Birch, LLP

(57) ABSTRACT

To provide a power switchover apparatus for a hybrid vehicle, which can perform power switchover smoothly. Target follow-up control is started, and when the engine speed reaches a clutch-in speed of a starter clutch, the input power shaft of a continuously variable transmission starts rotation. The speed of the output power shaft also begins to gradually rise in response to the starting of rotation. The engine speed then reaches a target, and transmission ratio raising control of raising the transmission ratio based on the difference between the motor speed of a drive shaft and the speed of a driven side pulley is started. The motor speed Nm of the drive motor and the speed of the driven side power transmission pulley then become equal to each other and the one-way clutch is placed into a connected state. Consequently, the transmission ratio raising control is stopped and normal control is entered.

20 Claims, 12 Drawing Sheets

POWER SWITCHOVER APPARATUS FOR A HYBRID VEHICLE

CROSS-REFERENCE TO RELATED APPLICATIONS

This nonprovisional application claims priority under 35 U.S.C. § 119(a) on Patent Application No. 2004-229414, filed in Japan on Aug. 5, 2004, the entirety of which is incorporated herein by reference.

BACKGROUND OF THE INVENTION

1. Field of the Invention

This invention relates to a power switchover apparatus for switching over the power source from a motor to an engine in a hybrid vehicle of the parallel type or the parallel and serial combined type wherein a drive shaft of the engine and a drive shaft of the motor are mechanically connected to each other.

2. Description of Background Art

An electric automobile using a motor as a power source provides no atmospheric pollution and low noise pollution and is high in acceleration and deceleration when compared with a conventional automobile, which uses an engine as a power source. However, presently, the cruising distance of an electric automobile is sometimes short due to a limitation in capacity of the batteries. Therefore, a hybrid vehicle, which uses a motor and an engine, has been put into practical use.

As such hybrid vehicles, those of a "series hybrid type", a "parallel hybrid type", and a "series-parallel combined type" are generally known. The hybrid vehicle of the series hybrid type uses a motor as the power source and uses an engine as a power source for a generator for charging the battery. The hybrid vehicle of the parallel hybrid type uses both a motor and an engine as the power source for the vehicle and uses them in response to a traveling condition and so forth. The hybrid vehicle of the series-parallel combined type selectively uses the two types in response to a traveling situation.

Since a motor is superior in low speed torque and efficiency in a low speed region when compared to an engine, a hybrid vehicle of the parallel hybrid type or the series-parallel combined type performs switchover control of the power source such that the motor is used as the power source in a low speed region whereas the engine is used as the power source in a middle or high speed region.

However, if the torque of the engine is added simply to the torque of the motor upon such power switchover, then the driving torque of the vehicle changes suddenly and a switchover shock occurs. Also when the rotational speeds of the engine and the motor do not coincide with each other, the driving torque of the vehicle changes suddenly and a switchover shock occurs similarly.

In order to reduce such a shock upon power switchover as just described, Japanese Patent Laid-Open No. 2000-23311 discloses a technique wherein an electromagnetic power clutch is interposed between an engine and a drive motor. When the power source is to be switched over, the output power of the motor is controlled so that the rotational speeds and the output torques of the engine and the drive motor may coincide witch each other. Then, at a point of time when the rotational speeds and the output torques become coincident with each other, exciting current is supplied to the clutch to establish connection of the engine and the drive motor.

According to the background art described above, it is necessary to provide an electromagnetic clutch between the engine and the drive motor, and it is necessary to provide a feed line for supplying exciting current to the electromagnetic clutch and a control apparatus for controlling the excitation current. Therefore, the background art described above has a configuration that is complicated and a weight that is increased.

SUMMARY OF THE INVENTION

It is an object of the present invention to provide a power switchover apparatus for a hybrid vehicle that solves the disadvantages of the background art described above and can perform power switchover smoothly with a configuration which is simple and not increased very much in weight.

In order to attain the object described above, according to the present invention, a power switchover apparatus for a hybrid vehicle has a starting clutch provided between a crankshaft of an engine and an automatic transmission, a one-way clutch interposed between the automatic transmission and a drive shaft, and a drive motor connected to the drive shaft, wherein, upon starting, the one-way clutch is controlled to idle using the motor as a power source, and thereafter, the one-way clutch is connected to switch over the power source to the engine. The power switchover apparatus ensures that the following steps are taken.

(1). The power switchover apparatus for a hybrid vehicle includes target rotational speed setting means for setting a target rotational speed of the engine when the power source is to be switched over from the motor to the engine, and control means for controlling the engine rotational speed and the transmission ratio of the automatic transmission in response to the target rotational speed. The control means includes means for controlling the engine rotational speed to follow up the target rotational speed, and means for controlling the transmission ratio of the automatic transmission to rise until the power of the engine is transmitted to the drive shaft while the engine rotational speed remains following up the target rotational speed.

(2). The target rotational speed setting means sets a first target rotational speed of the engine to be used when the power source is to be switched over from the motor to the engine and a second target rotational speed lower than the first target rotational speed. The control means controls the engine rotational speed to follow up the second target rotational speed, controls the transmission ratio of the automatic transmission to rise until the power of the engine is transmitted to the drive shaft while the control means controls the engine rotational speed to remain following up the second target rotational speed, and controls the transmission ratio of the automatic transmission so that, after the power of the engine is transmitted to the drive shaft, the engine rotational speed is controlled to follow up the first target value. The rotational speed of the drive shaft is kept fixed irrespective of the rise of the engine rotational speed.

(3). The means for raising the transmission ratio of the automatic transmission causes the transmission ratio to be raised after the one-way clutch is placed into a connected state.

(4). The means for raising the transmission ratio of the automatic transmission decides disconnection or connection of the one-way clutch based on a difference in rotational speed between an output power shaft of the automatic transmission and the drive shaft.

(5). The means for raising the transmission ratio of the automatic transmission starts to raise the transmission ratio when the engine rotational speed reaches the target rotational speed.

(6). The means for raising the transmission ratio of the automatic transmission starts to raise the transmission ratio when the starting clutch is connected.

(7). The means for raising the transmission ratio of the automatic transmission starts to raise the transmission ratio when the engine rotational speed reaches the second target rotational speed.

According to the present invention, the following effects are achieved.

(1). According to a first aspect of the present invention, when the power source is switched over from the drive motor to the engine, only the transmission ratio of the automatic transmission is controlled to transmit the power of the engine to the drive shaft while the engine rotational speed is maintained fixed. Therefore, the influence of the inertial mass around the engine can be reduced.

(2). According to a second aspect of the present invention, the second target rotational speed is set lower than the first rotational speed. Therefore, the transmission ratio of the automatic transmission can be raised steeply. As a result, the time required for the power switchover can be shortened.

(3). According to a third aspect of the present invention, the power source is switched over after the connection of the one-way clutch is completed. Therefore, smooth power switchover can be achieved.

(4). According to a fourth aspect of the present invention, the connection or disconnection state of the one-way clutch can be detected simply.

(5). According to a fifth aspect of the present invention, the raising of the transmission ratio is started after the engine rotational speed reaches the target rotational speed. Therefore, the power source can be switched over in a state wherein it is certain that the engine rotational speed is maintained at the target rotational speed.

(6). According to a sixth aspect of the present invention, if the starting clutch is connected, then the raising of the transmission ratio is started even before the engine rotational speed reaches the target rotational speed. Consequently, the time required for power switchover can be shortened.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
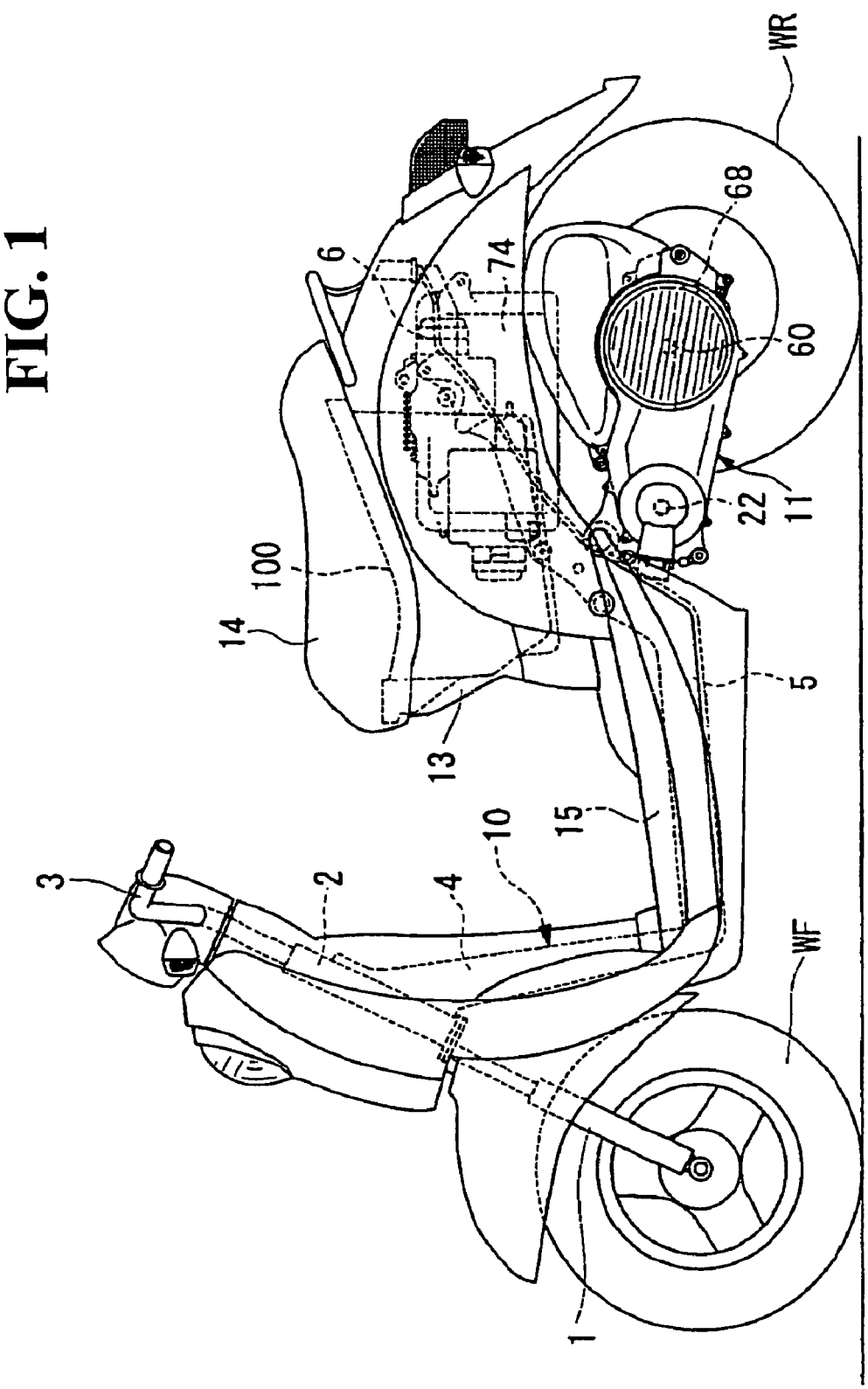
FIG. 1 is a side elevational view of a motorcycle according to an embodiment of a hybrid vehicle according to the present invention.

In the following description, preferred embodiments of the present invention are described in detail with reference to the accompanying drawings. FIG. 1 is a side elevational view of an embodiment of a hybrid vehicle to which an embodiment of the present invention is applied.

The hybrid vehicle includes a front fork 1 for supporting a front wheel WF for rotation at a front portion of a vehicle body. The front fork 1 is supported for pivotal motion on a head pipe 2 and can be steered by operation of a handle bar 3. A down pipe 4 is attached to the head pipe 2 and extends rearwardly and downwardly from the head pipe 2, and an intermediate frame 5 extends substantially horizontally from a lower end of the down pipe 4. Furthermore, a rear frame 6 is formed to extend rearwardly and upwardly from a rear end of the intermediate frame 5.

A power unit 11 including a power source is mounted at one end thereof for pivotal motion on a vehicle body frame 10 configured in such a manner as described above. The power unit 11 has a rear wheel WR, which serves as a driving wheel, attached for rotation at the rear end thereof and is suspended by a rear cushion (shock absorber) attached to the rear frame 6.

An outer periphery of the vehicle body frame 10 is covered with a vehicle body cover 13. A seat 14 for seating a passenger is secured to a rear upper face of the vehicle body cover 13. A step floor 15 for receiving the feet of the passenger is formed on the vehicle body frame 10 forwardly of the seat 14. An accommodation box 100 is provided below the seat 14 and functions as a utility space for accommodating a helmet or some other baggage and so forth therein.

Figure 2:
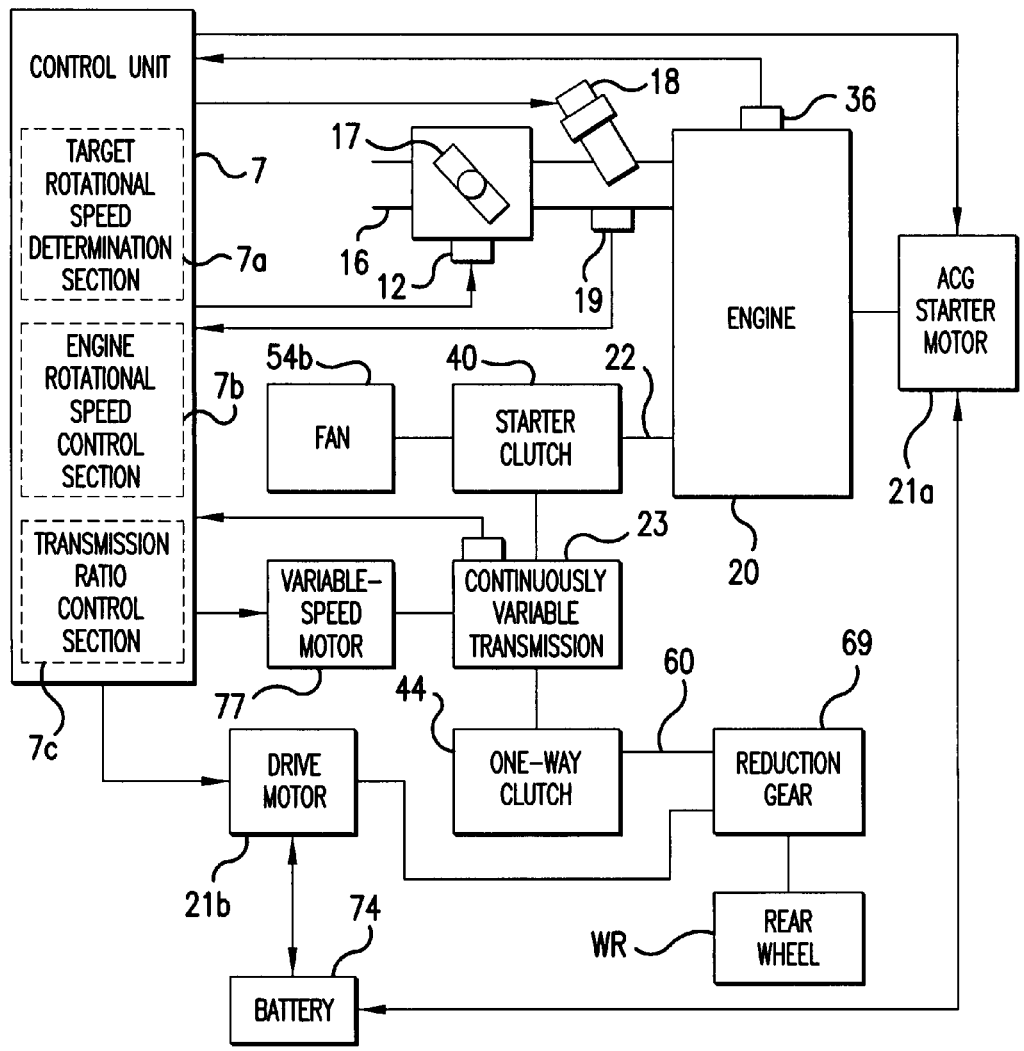
FIG. 2 is a block diagram showing a system configuration of the motorcycle shown in FIG. 1.

FIG. 2 is a block diagram showing a system configuration of the hybrid vehicle described above. The power unit 11 includes an engine 20, an ACG starter motor 21a serving as an engine starter and a generator, and a continuously variable transmission (power transmission means) 23 connected to a crankshaft 22 for transmitting power of the engine 20 to the rear wheel WR. The power unit 11 further includes a variable-speed motor 77 for changing the transmission ratio of the continuously variable transmission 23, a starter clutch 40 for connecting or disconnecting the power transmission between the crankshaft 22 and an input power shaft of the continuously variable transmission 23, and a drive motor 21b which functions as a motor or a generator. The power unit 11 further includes a one-way clutch (one-way power transmission means) 44 which transmits power from the engine 20 and the drive motor 21b to the rear wheel WR side but does not transmit power from the rear wheel WR to the engine 20 side. The power unit 11 further includes a reduction gear 69 for transmitting the output power from the continuously variable transmission 23 at a reduced speed to the rear wheel WR. An engine rotational speed sensor 36 detects the rotational speed Ne of the engine 20.

The power of the engine 20 is transmitted from the crankshaft 22 to the rear wheel WR through the starter clutch 40, continuously variable transmission 23, one-way clutch 44, drive shaft 60, and reduction gear 69. On the other hand, the power of the drive motor 21b is transmitted to the rear wheel WR through the drive shaft 60 and the reduction gear 69. In short, in the present embodiment, the drive shaft 60 serves also as an output power shaft of the drive motor 21b.

A battery 74 is connected to the ACG starter motor 21a and the drive motor 21b. When the drive motor 21b functions as a motor and when the ACG starter motor 21a functions as a starter, the battery 74 supplies electric power to the motors 21a and 21b. However, when the ACG starter motor 21a and the drive motor 21b function as generators, regenerated electric power from the ACG starter motor 21a and the drive motor 21b is used to charge the battery 74.

A throttle valve 17 for controlling the amount of air is provided for pivotal motion in an intake pipe 16 of the engine 20. The throttle valve 17 is pivoted in response to an operation amount of a throttle grip (not shown) operated by the passenger. It is to be noted that, in the present embodiment, a DBW (Drive By Wire) system 12 is incorporated, and the throttle valve 17 can be automatically controlled based on the engine rotational speed, vehicle speed, or the like independently of an operation of the passenger. An injector 18, which injects fuel, and a negative pressure sensor 19, which detects a negative pressure in the intake pipe, are disposed between the throttle valve 17 and the engine 20.

A control unit 7 includes a target rotational speed determination section 7a for determining a target rotational speed of the engine when the power source is to be switched over from the drive motor 21b to the engine 20. The control unit 7 further includes an engine rotational speed control section 7b for controlling the engine rotational speed upon power switchover, and a transmission ratio control section 7c for controlling the transmission ratio of the continuously variable transmission 23 upon power switchover.

Figure 3:
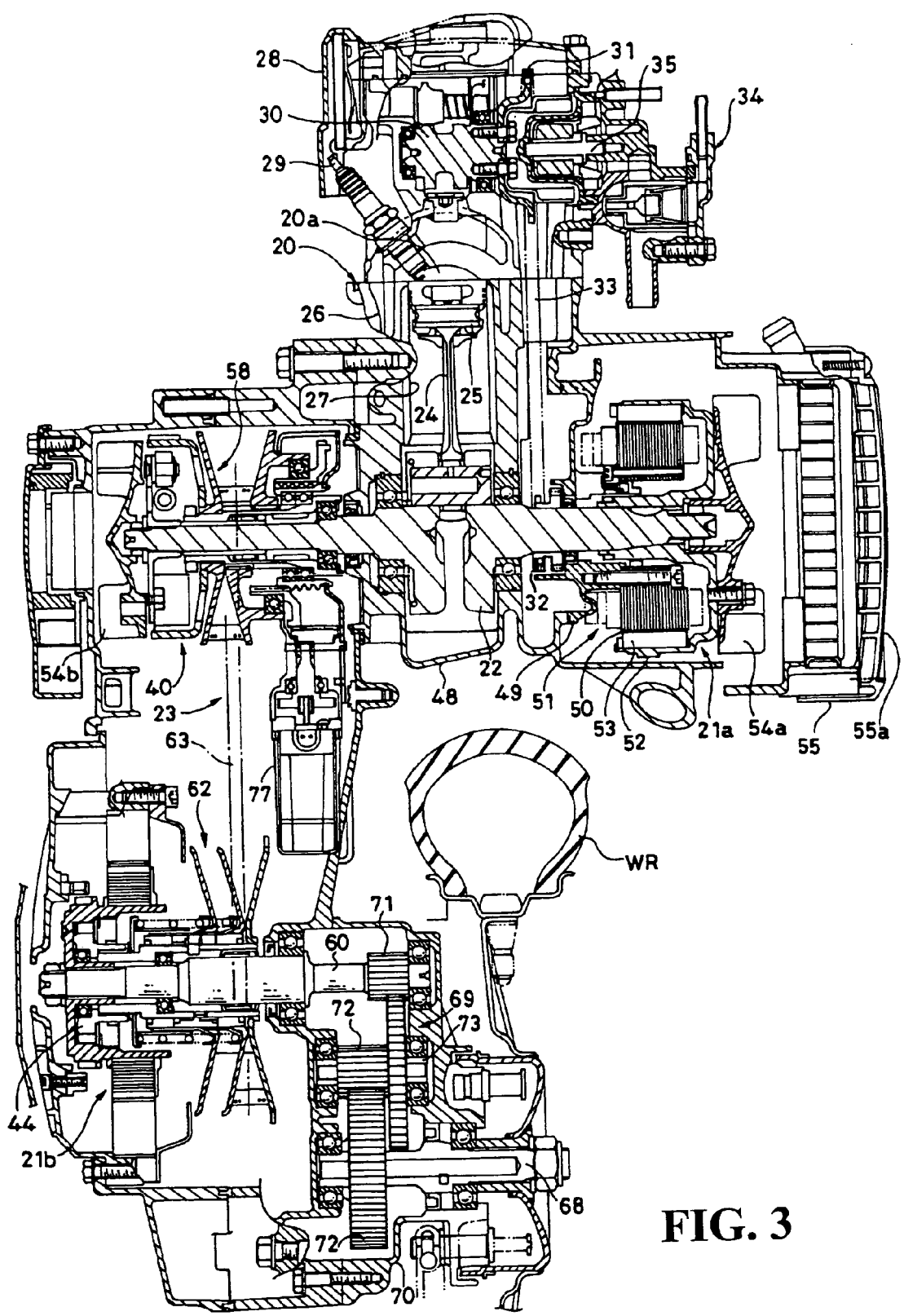
FIG. 3 is a sectional view of a power unit of the motorcycle shown in FIG. 1.

A configuration of the power unit 11 including the engine 20 and the drive motor 21b will now be described with reference to FIG. 3. The engine 20 includes a piston 25 connected to the crankshaft 22 through a connecting rod 24. The piston 25 is slidably movable in a cylinder 27 provided in a cylinder block 26. The cylinder block 26 is disposed such that an axial line of the cylinder 27 extends substantially horizontally. A cylinder head 28 is secured to a front face of the cylinder block 26. A combustion chamber 20a in which an air fuel mixture is to be burned is formed by the cylinder head 28, cylinder 27, and piston 25.

A valve (not shown), which controls intake of an air fuel mixture into the combustion chamber 20a or exhaust from the combustion chamber 20a, and an ignition plug 29 are disposed in the cylinder head 28. Opening and closing movement of the valve is controlled by rotation of a camshaft 30 supported for rotation on the cylinder head 28. The camshaft 30 includes a driven sprocket wheel 31 provided on one end side thereof, and an endless cam chain 33 extends between and around the driven sprocket wheel 31 and a driving sprocket wheel 32 provided at one end of the crankshaft 22. A water pump 34 for cooling the engine 20 is provided at one end of the camshaft 30. The water pump 34 is attached such that a rotary shaft 35 thereof rotates integrally with the camshaft 30. Accordingly, when the camshaft 30 rotates, the water pump 34 can operate.

The crankshaft 22 is supported for rotation in a crankcase 48. A stator case 49 is connected to the right side of the crankcase 48 in a vehicle widthwise direction. The ACG starter motor 21a is accommodated in the inside of the stator case 49. The ACG starter motor 21a is a motor of the so-called outer rotor type and includes teeth 50 secured to the stator case 49 and coils 51 formed from a conductor wound on the teeth 50. An outer rotor 52 is secured to the crankshaft 22 and has a substantially cylindrical shape which covers an outer periphery of the stator. Magnets 53 are disposed on an inner circumferential face of the outer rotor 52.

A fan 54a for cooling the ACG starter motor 21a is attached to the outer rotor 52. When the fan 54a rotates in synchronism with the crankshaft 22, cooling air is taken in through a cooling water inlet port formed in a side wall 55a of a cover 55 of the stator case 49.

A transmission case 59 is connected to the left side of the crankcase 48 in the vehicle widthwise direction. A fan 54b secured to a left end portion of the crankshaft 22, the continuously variable transmission 23 whose driving side is connected to the crankshaft 22 through the starter clutch 40, and the drive motor 21b connected to the driven side of the continuously variable transmission 23 are accommodated in the transmission case 59. The fan 54b cools the continuously variable transmission 23 and the drive motor 21b accommodated in the transmission case 59 and is disposed on the same side as that of the drive motor 21b with respect to the continuously variable transmission 23, that is, in the present embodiment, on the left side in the vehicle widthwise direction.

A cooling air inlet port 59a is formed on the front side and the left side of the vehicle body of the transmission case 59. When the fan 54b rotates in synchronism with the crankshaft 22, external air is taken into the transmission case 59 through the cooling air inlet port 59a positioned in the proximity of the fan 54b and the drive motor 21b and the continuously variable transmission 23 are cooled compulsorily by the external air.

The continuously variable transmission 23 is a belt converter including a driving side power transmission pulley 58, a driven side power transmission pulley 62, and an endless V belt 63 extending between and around the driving side power transmission pulley 58 and the driven side power transmission pulley 62. The driving side power transmission pulley 58 is mounted at a left end portion of the crankshaft 22, which projects in the vehicle widthwise direction from the crankcase 48, through the starter clutch 40. The driven side power transmission pulley 62 is mounted through the one-way clutch 44 on the drive shaft 60 supported for rotation in the transmission case 59 in such a manner as to have an axial line parallel to the crankshaft 22.

Figure 4:
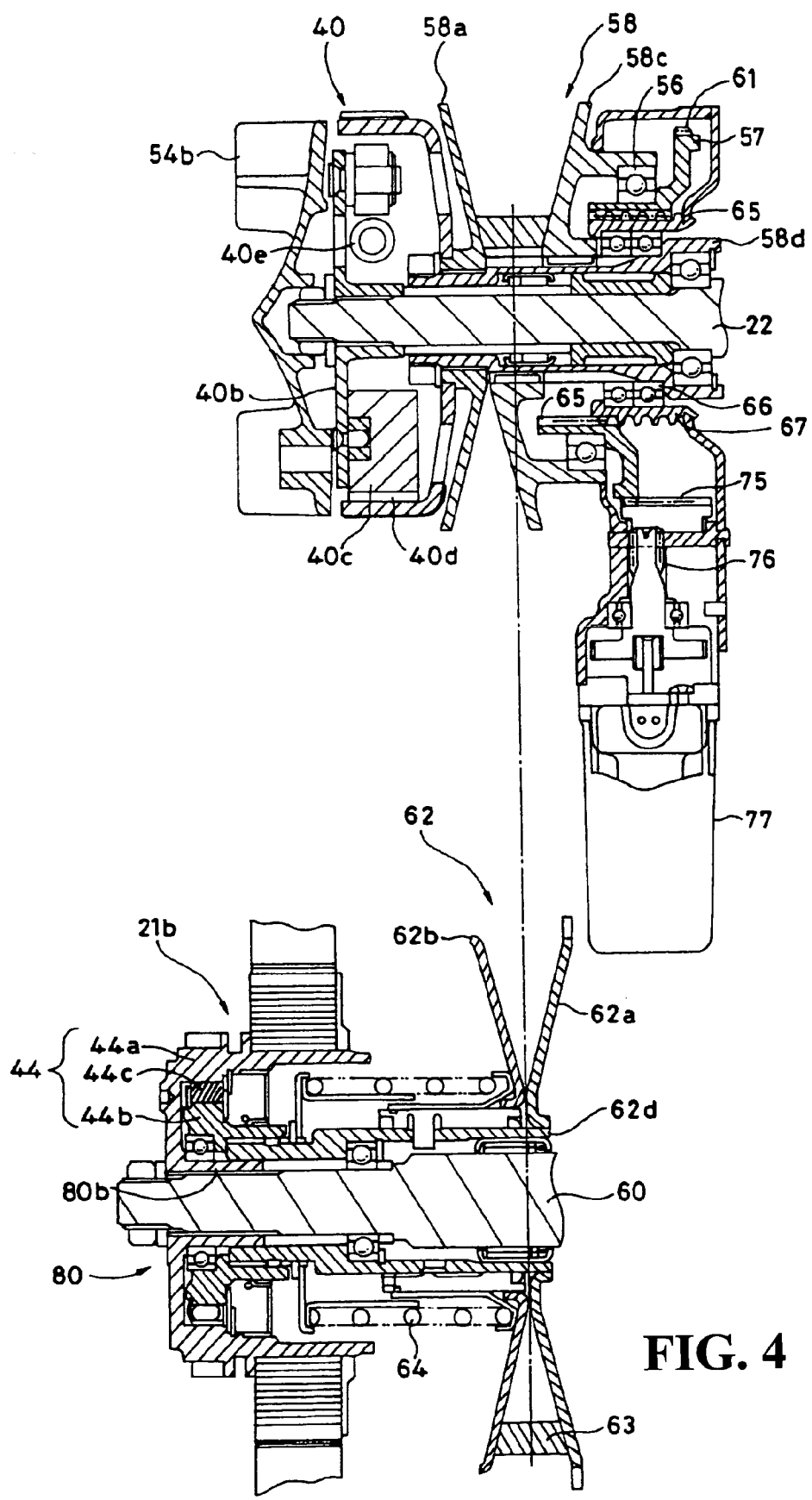
FIG. 4 is an enlarged view of an essential part of FIG. 3.

The driving side power transmission pulley 58 is mounted for rotation in a circumferential direction with respect to the crankshaft 22 through a sleeve 58d as shown in an enlarged view of an essential part of FIG. 4. The driving side power transmission pulley 58 includes a driving side fixed pulley half 58a securely mounted on the sleeve 58d, and a driving side movable pulley half 58c attached for sliding movement with respect to the sleeve 58d in its axial direction but against rotation in a circumferential direction. A speed change ring 57 is attached for rotation to the driving side movable pulley half 58c through a bearing 56.

The speed change ring 57 has a gear 61 formed along a circumferential direction on a large diameter portion of an outer circumference thereof and has a trapezoidal screw thread 65 formed along an axial direction on an inner circumference thereof. Another trapezoidal screw thread 67 is held in meshing engagement with the trapezoidal screw thread 65. The trapezoidal screw thread 67 is attached to the sleeve 58d through a bearing 66 such that it can rotate in a circumferential direction but cannot slidably move in an axial direction. A worm wheel 75 is held in meshing engagement with the gear 61 of the speed change ring 57, and a worm gear 76 is held in meshing engagement with the worm wheel 75. The worm gear 76 is connected to a rotary shaft of the variable-speed motor 77 for controlling the transmission ratio.

On the other hand, the driven side power transmission pulley 62 includes a driven side fixed pulley half 62a and a driven side movable pulley half 62b. The driven side fixed pulley half 62a is attached for rotation on the drive shaft 60 through a sleeve 62d such that it is held against sliding movement in the axial direction but can be rotated in a circumferential direction. The driven side movable pulley half 62b is attached for sliding movement in the axial direction on the sleeve 62d.

A belt groove of a substantially V-shaped cross section is formed between the driving side fixed pulley half 58a and the driving side movable pulley half 58c and between the driven side fixed pulley half 62a and the driven side movable pulley half 62b. The endless V belt 63 extends between and around the belt grooves.

A spring (resilient member) 64 is disposed on the rear face side (left side in the vehicle widthwise direction) of the driven side movable pulley half 62b. The spring 64 normally biases the driven side movable pulley half 62b toward the driven side fixed pulley half 62a.

In order to vary the transmission ratio of the continuously variable transmission 23, the variable-speed motor 77 is driven in a direction corresponding to an up/down of the transmission ratio. The driving force of the variable-speed motor 77 is transmitted to the gear 61 of the speed change ring 57 through the worm gear 76 and the worm wheel 75 to rotate the speed change ring 57. The speed change ring 57 is held in meshing engagement with the sleeve 58d through the trapezoidal screws 65 and 67. Therefore, if the direction of rotation is the shift up direction, then the speed change ring 57 moves in the leftward direction in the figure on the crankshaft 22. Thereupon, the driving side movable pulley half 58c slidably moves to the driving side fixed pulley half 58a side. The driving side movable pulley half 58c approaches the driving side fixed pulley half 58a by a distance of the sliding movement and the groove width of the driving side power transmission pulley 58 decreases. Consequently, the contact position between the driving side power transmission pulley 58 and the V belt 63 is displaced to the outer side in a radial direction of the driving side power transmission pulley 58, and the wrapping diameter of the V belt 63 increases. Thereupon, in the driven side power transmission pulley 62, the groove width formed by the driven side fixed pulley half 62a and the driven side movable pulley half 62b increases. In short, the wrapping diameter (transmission pitch diameter) of the V belt 63 continuously varies to automatically and indefinitely change the transmission ratio in response to the rotational speed of the crankshaft 22.

The starter clutch 40 includes a cup-shaped outer case 40a securely mounted on the sleeve 58d, an outer plate 40b securely mounted at a left end portion of the crankshaft 22, a shoe 40d attached to an outer peripheral portion of the outer plate 40b through a weight 40c such that it is directed to the outer side in a radial direction, and a spring 40e for biasing the shoe 40d to the inner side in a radial direction.

When the engine rotational speed, that is, the speed of rotation of the crankshaft 22, is equal to or lower than a predetermined value (for example, 3,000 rpm), the power transmission between the crankshaft 22 and the continuously variable transmission 23 is interrupted by the starter clutch 40. If the engine rotational speed rises until the speed of rotation of the crankshaft 22 exceeds the predetermined value, then the centrifugal force acting upon the weight 40c exceeds the resilient force acting upon the inner side in a radial direction from the spring 40e. Consequently, the weight 40c moves to the outer side in the radial direction. Thereupon, the shoe 40d presses the inner circumferential face of the outer case 40a with force higher than a predetermined value. Consequently, rotation of the crankshaft 22 is transmitted to the sleeve 58d through the outer case 40a, and the driving side power transmission pulley 58 secured to the sleeve 58d is driven.

The one-way clutch 44 includes a cup-shaped outer clutch 44a, an inner clutch 44b fitted coaxially in the outer clutch 44a, and a roller 44c for allowing power to be transmitted only in one direction from the inner clutch 44b to the outer clutch 44a. The outer clutch 44a serves also an inner rotor 80 of the drive motor 21b and is formed from the same member as the inner rotor 80.

The power from the engine 20 side transmitted to the driven side power transmission pulley 62 of the continuously variable transmission 23 is transmitted to the rear wheel WR through the driven side fixed pulley half 62a, inner clutch 44b, outer clutch 44a, that is, inner rotor body, drive shaft 60, and reduction gear 69. On the other hand, the power from the rear wheel WR side when the user walks and pushes the vehicle, upon regeneration operation and so forth, is transmitted to the inner rotor body, that is, to the outer clutch 44a, through the reduction gear 69 and the drive shaft 60. However, the outer clutch 44a rotates but idly with respect to the inner clutch 44b. Therefore, the power is not transmitted to the continuously variable transmission 23 or the engine 20.

The drive motor 21b of the inner rotor type whose motor output power shaft is the drive shaft 60 is provided on the transmission case 59 on the rear side of the vehicle body. The inner rotor 80 includes the drive shaft 60, which is also the output power shaft of the continuously variable transmission 23, and the inner rotor body, that is, the inner clutch 44b, having a cup-like shape and coupled by spline coupling to the drive shaft 60 at a boss portion 80b formed at a central portion of the cup shape. A magnet is disposed on an outer peripheral face on the opening side of the inner clutch 44b.

Referring back to FIG. 3, the reduction gear 69 is provided in a transmission chamber 70 connecting to the right side of a rear end portion of the transmission case 59 and includes an intermediate shaft 73 supported for rotation in parallel to the drive shaft 60 and an axle 68 of the rear wheel WR. The reduction gear 69 further includes a pair of first speed reducing gears 71, 71 and a pair of second speed reducing gears 72, 72. The gears 71, 71 are formed individually at a right end portion of the drive shaft 60 and a central portion of the intermediate shaft 73. The gears 72, 72 are formed individually at a right end portion of the intermediate shaft 73 and a left end portion of the axle 68. Through the configuration, rotation of the drive shaft 60 is decreased at a predetermined reduction ratio and transmitted to the axle 68 of the rear wheel WR supported for rotation in parallel to the drive shaft 60.

In the hybrid vehicle having the configuration described above, upon starting of the engine, the ACG starter motor 21*a* on the crankshaft 22 is used to rotate the crankshaft 22. Thereupon, the starter clutch 40 is not in a connected state, and the power transmission from the crankshaft 22 to the continuously variable transmission 23 is interrupted.

If the throttle grip is operated in an opening direction, then in the present embodiment, only the drive motor 21*b* serves as the power source while the throttle opening θth is small. Rrotation of the drive shaft 60 by the drive motor 21*b* is not transmitted to the driven side power transmission pulley 62 through the one-way clutch 44. Therefore, the continuously variable transmission 23 is not driven. Consequently, when only the drive motor 21*b* is used to drive the rear wheel WR to cause the vehicle to run, the energy transmission efficiency is improved.

If the throttle opening θth increases to raise the engine rotational speed until the speed of rotation of the crankshaft 22 exceeds a predetermined value (for example, 3000 rpm), then the rotating power of the crankshaft 22 is transmitted to the continuously variable transmission 23 through the starter clutch 40 and inputted to the one-way clutch 44. When the speed of rotation of the input side of the one-way clutch 44 and the speed of rotation of the output side of the one-way clutch 44, that is, the drive shaft 60, coincide with each other, then the power source is switched over from the drive motor 21*b* to the engine 20.

Figure 5:
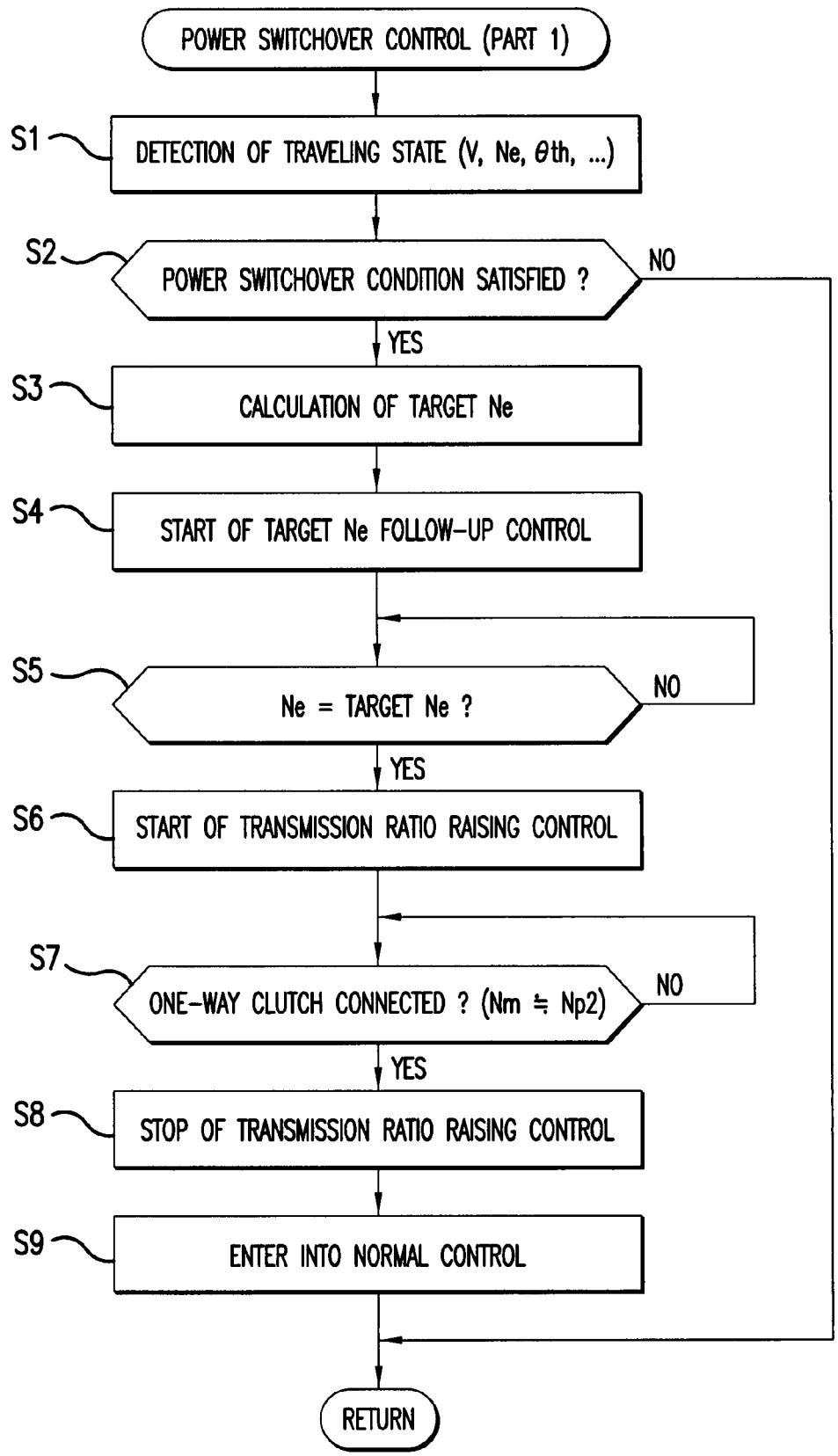
FIG. 5 is a flow chart illustrating a procedure of a first embodiment of a power switchover method.
Figure 6:
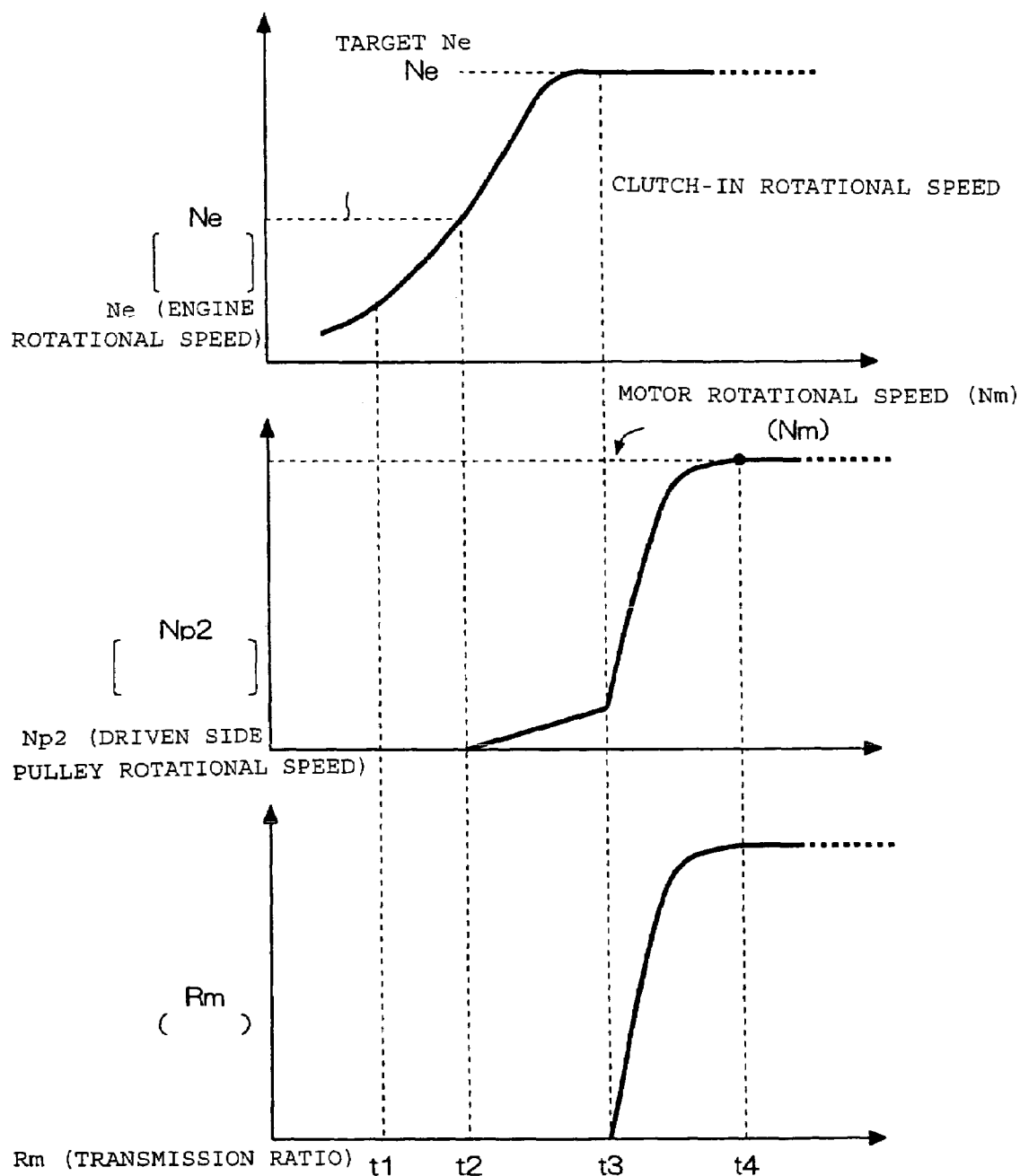
FIG. 6 is a timing chart of the first embodiment of the power switchover method.

FIG. 5 is a flow chart illustrating a procedure of the first embodiment of the power switchover method, and FIG. 6 is a timing chart of the procedure.

At step S1, the traveling state of the vehicle is determined based on results of detection of the vehicle speed V, engine rotational speed Ne, throttle opening θth, and so forth. At step S2, it is determined based on the traveling state whether or not a power switchover condition for switching over the power source from the drive motor 21*b* to the engine 20 is satisfied. If such a power switchover condition is satisfied, that is, if the throttle opening θth is higher than a reference opening and the vehicle speed V and the engine rotational speed Ne exhibit an increasing tendency, then the processing advances to step S3.

At step S3, a target engine rotational speed (target Ne) upon power switchover is calculated by the target rotational speed determination section 7*a* based on the vehicle speed V and the throttle opening θth at present. At step S4, the engine rotational speed control section 7*b* is energized to start target Ne follow-up control of increasing or decreasing the throttle opening θth independently of the throttle operation by means of the DBW system 12 to raise the engine rotational speed to the target Ne. For the follow-up control, PID (proportional-plus-integral) control is adopted.

If the target Ne follow-up control is started at time t1 of FIG. 6 and the engine rotational speed Ne reaches a clutch-in speed of the starter clutch 40 at time t2, then the input power shaft (driving side power transmission pulley 58) of the continuously variable transmission 23 starts rotation, and also the rotational speed Np2 of the output power shaft (driven side pulley 62) begins to gradually rise in response to the starting of rotation. However, at this point of time, the rotational speed Np2 of the driven side power transmission pulley 62 is lower than the motor rotational speed Nm of the drive motor 21*b* and the one-way clutch 44 is in an idling state. Therefore, the power is not transmitted between the drive motor 21*b* and the engine 20.

At time t3, the engine rotational speed Ne reaches the target Ne. If this is detected at step S5, then the transmission ratio control section 7*c* is energized at step S6 to start transmission ratio raising control of raising the transmission ratio Rm by PID control based on the difference between the number of rotations of the drive shaft 60, that is, the motor rotational speed Nm, and the rotational speed Np2 of the driven side power transmission pulley 62.

At time t4, the motor rotational speed Nm of the drive motor 21*b* and the rotational speed Np2 of the driven side power transmission pulley 62 become equal to each other and the one-way clutch 44 is placed into a connected state. When this is detected at step S7, the transmission ratio raising control is stopped at step S8. At step S9, normal control is entered and the power source is switched over from the drive motor 21*b* to the engine 20.

Figure 7:
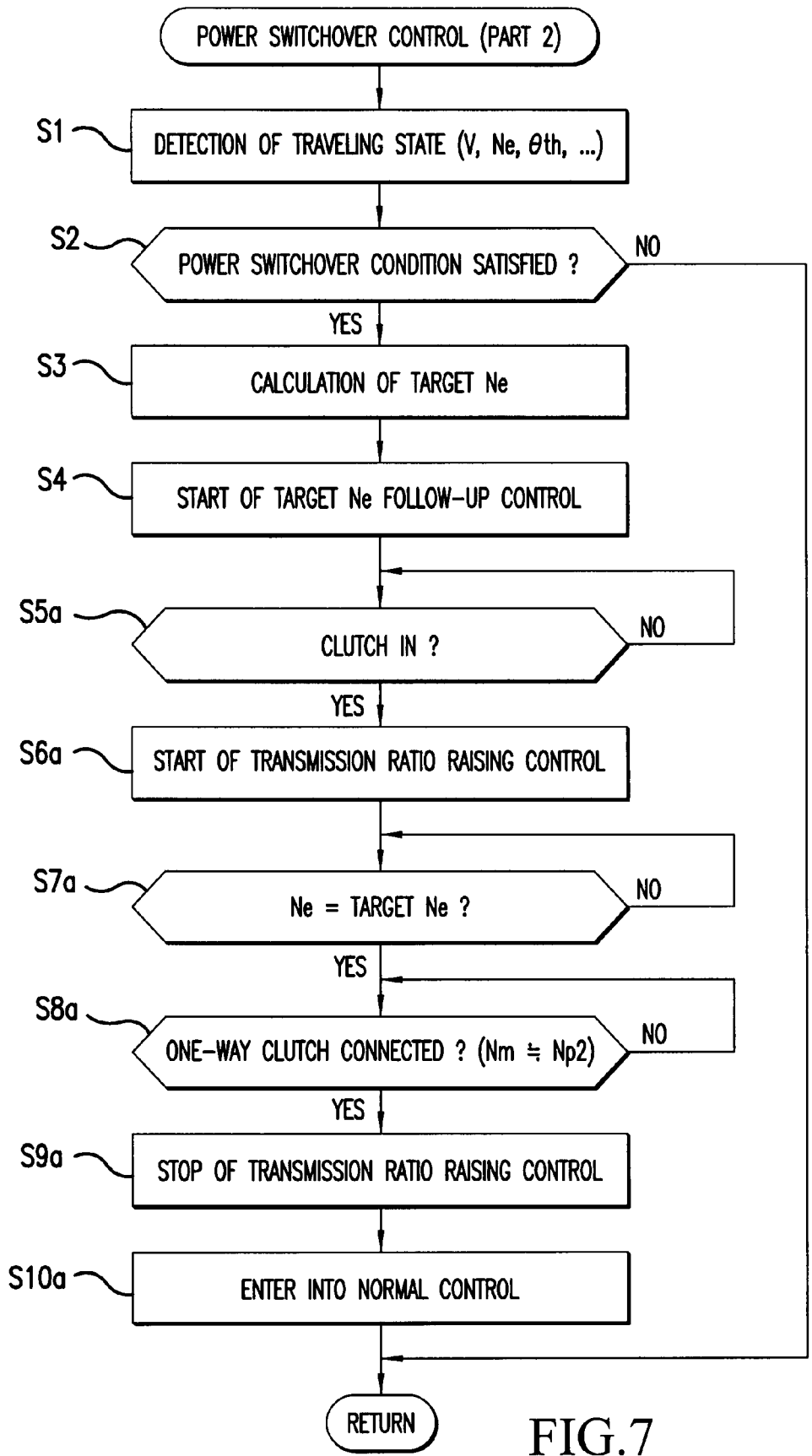
FIG. 7 is a flow chart illustrating a procedure of a second embodiment of the power switchover method.
Figure 8:
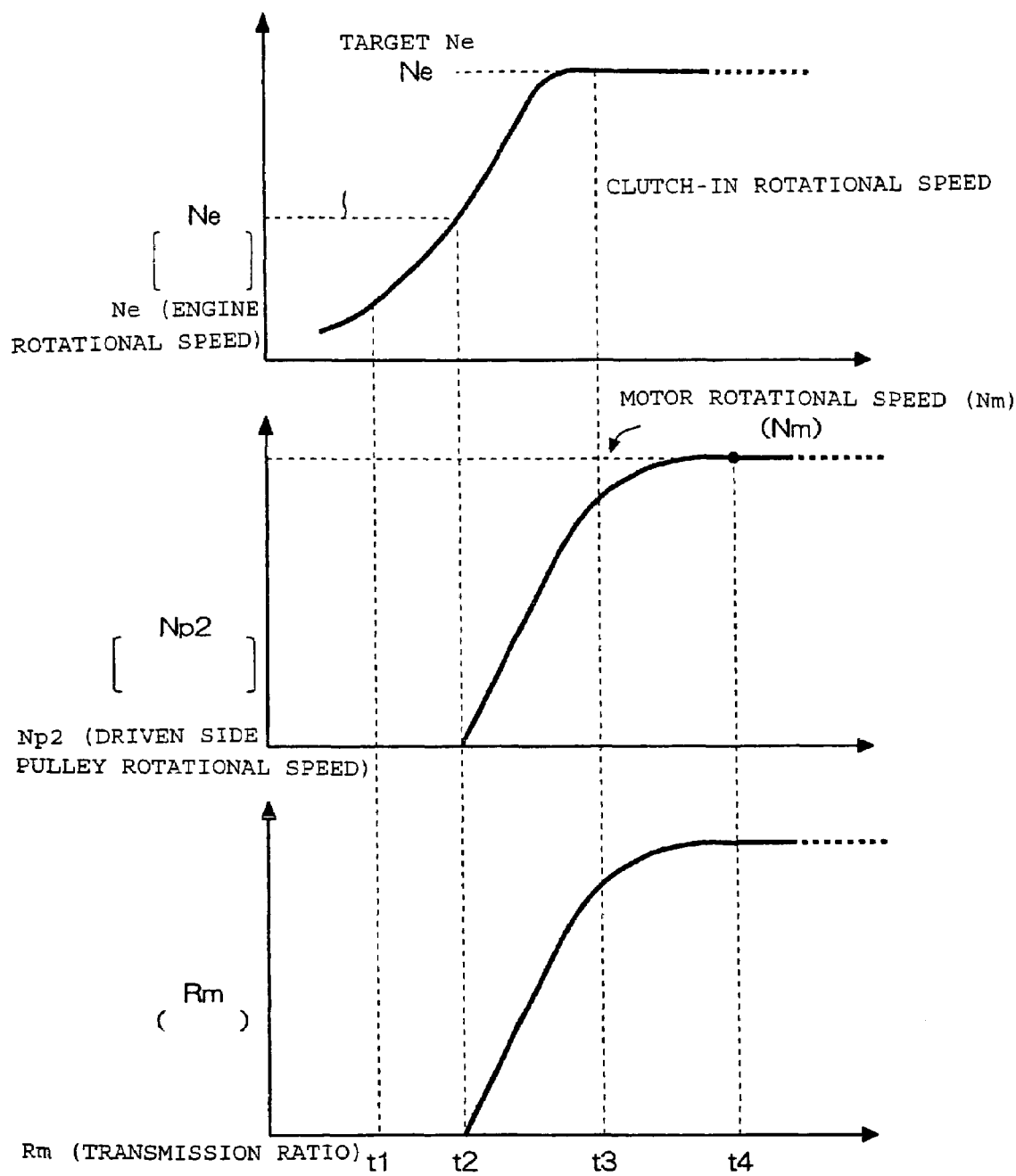
FIG. 8 is a timing chart of the second embodiment of the power switchover method.

FIG. 7 is a flow chart of a power switchover method according to a second embodiment of the present invention, and FIG. 8 is a timing chart of the power switching method.

At step S1, the traveling state of the vehicle is determined based on results of detection of the vehicle speed V, engine rotational speed Ne, throttle opening θth, and so forth. At step S2, it is determined based on the traveling state whether or not a power switchover condition for switching over the power source from the drive motor 21*b* to the engine 20 is satisfied. If such a power switchover condition is satisfied, that is, the throttle opening θth is higher than a reference opening and the vehicle speed V and the engine rotational speed Ne exhibit an increasing tendency, then the processing advances to step S3.

At step S3, a target engine rotational speed (target Ne) upon power switchover is calculated by the target rotational speed determination section 7*a* based on the vehicle speed V and the throttle opening θth at present. At step S4, the engine rotational speed control section 7*b* is energized to start target Ne follow-up control of increasing or decreasing the throttle opening θth independently of the throttle operation by means of the DBW system 12 to raise the engine rotational speed to the target Ne. For the follow-up control, PID control is adopted.

If the target Ne follow-up control is started at time t1 of FIG. 8 and the engine rotational speed reaches a clutch-in speed of the starter clutch 40 at time t2, then the input power shaft (driving side power transmission pulley 58) of the continuously variable transmission starts rotation. In addition, the rotational speed Np2 of the output power shaft (driven side pulley 62) begins to gradually rise in response to the starting of rotation. However, at this point of time, the rotational speed Np2 of the driven side power transmission pulley 62 is lower than the motor rotational speed Nm of the drive motor 21*b* and the one-way clutch 44 is in an idling state. Therefore, the power is not transmitted between the drive motor 21*b* and the engine 20.

When the clutch-in of the starter clutch 40 is detected at step S5*a*, the transmission ratio control section 7*c* is energized at step S6*a* to start transmission ratio raising control of raising the transmission ratio by PID control based on the difference between the motor rotational speed Nm of the drive motor 21*b* and the rotational speed Np2 of the driven side power transmission pulley 62. At time t3, the engine rotational speed Ne reaches the target Ne. If this is detected at step S7*a*, then at step S8*a*, it is decided based on the motor rotational speed Nm of the drive motor 21*b* and the rotational speed Np2 of the driven side power transmission pulley 62 whether or not the one-way clutch 44 is connected.

At time t4, the motor rotational speed Nm of the drive motor 21*b* and the rotational speed Np2 of the driven side power transmission pulley 62 become equal to each other and the one-way clutch 44 is placed into a connected state. When this is detected at step S8a, the transmission ratio raising control is stopped at step S9a. At step S10a, normal control is entered and the power source is switched over from the drive motor 21b to the engine 20.

Figure 9:
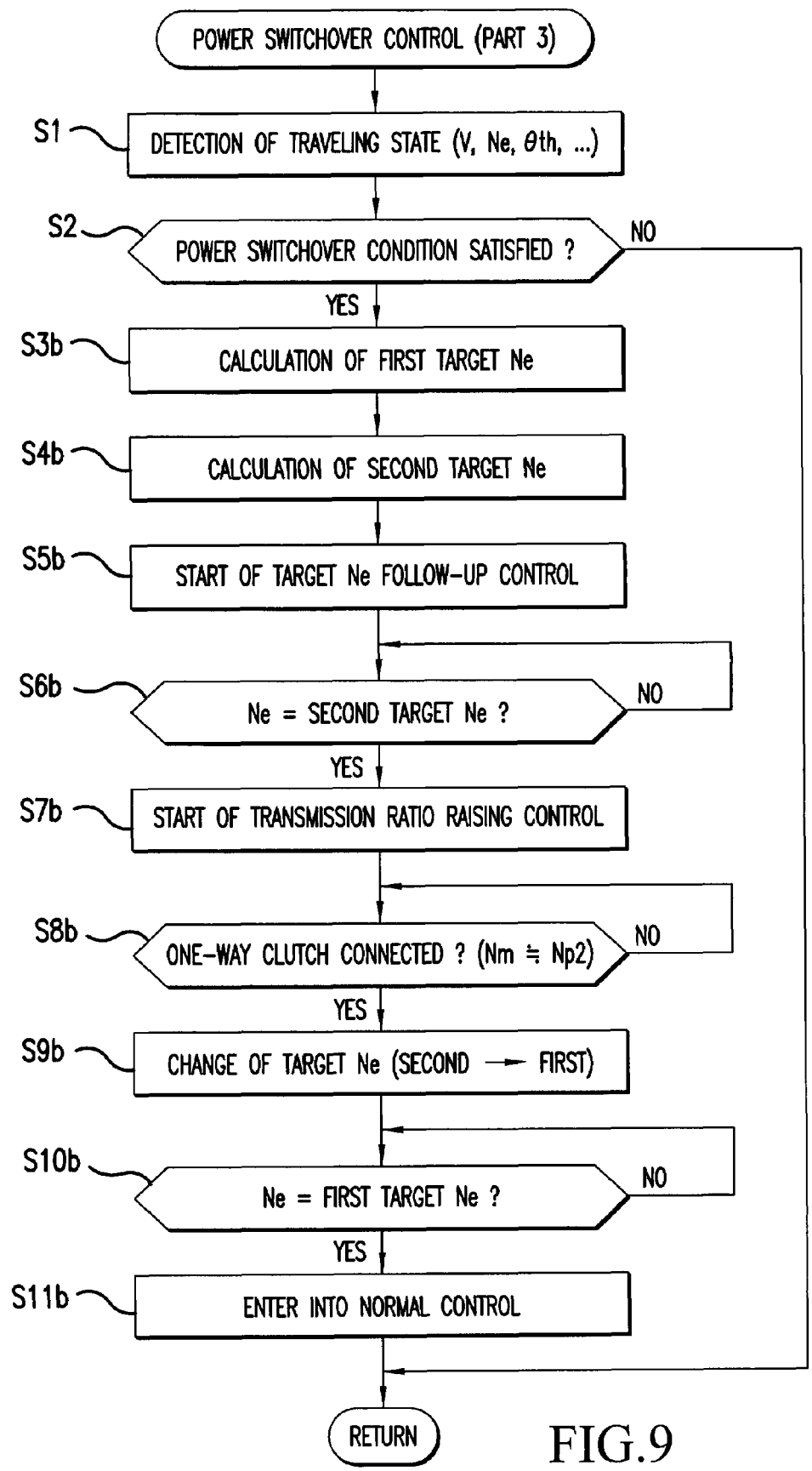
FIG. 9 is a flow chart illustrating a procedure of a third embodiment of the power switchover method.
Figure 10:
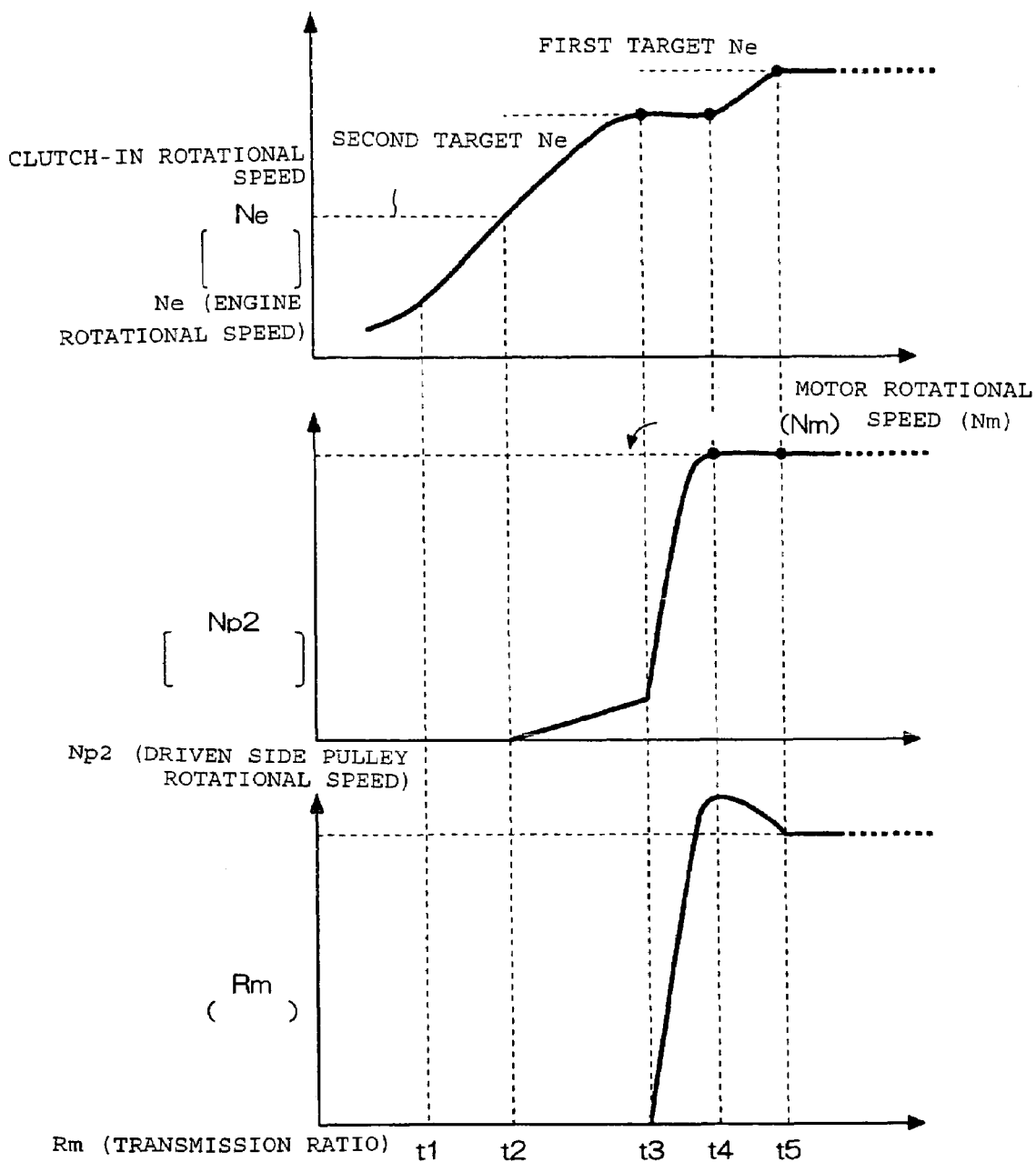
FIG. 10 is a timing chart of the third embodiment of the power switchover method.

FIG. 9 is a flow chart of a power switchover method according to a third embodiment of the present invention, and FIG. 10 is a timing chart of the power switching method.

At step S1, the traveling state of the vehicle is determined based on results of detection of the vehicle speed V, engine rotational speed Ne, throttle opening θth, and so forth. At step S2, it is determined based on the traveling state whether or not a power switchover condition for switching over the power source from the drive motor 21b to the engine 20 is satisfied. If such a power switchover condition is satisfied, that is, the throttle opening θth is higher than a reference opening and the vehicle speed V and the engine rotational speed Ne exhibit an increasing tendency, then the processing advances to step S3b.

At step S3b, a target engine rotational speed (first target Ne) upon power switchover is calculated by the target rotational speed determination section 7a based on the vehicle speed V and the throttle opening θth at present. At step S4b, a second target Ne a little lower than the first target Ne is calculated based on the vehicle speed V and the throttle opening θth at present similarly. At step S5b, the engine rotational speed control section 7b is energized to start target Ne follow-up control of increasing or decreasing the throttle opening θth independently of the throttle operation by means of the DBW system 12 to raise the engine rotational speed to the second target Ne. For the follow-up control, PID control is adopted.

If the target Ne follow-up control is started at time t1 of FIG. 10 and the engine rotational speed reaches a connection speed of the starter clutch 40 at time t2, then the input power shaft (driving side power transmission pulley 58) of the continuously variable transmission starts rotation. In addition, the rotational speed Np2 of the output power shaft (driven side pulley 62) begins to gradually rise in response to the starting of rotation. However, at this point of time, the rotational speed Np2 of the driven side power transmission pulley 62 is lower than the motor rotational speed Nm of the drive motor 21b and the one-way clutch 44 is in an idling state. Therefore, the power is not transmitted between the drive motor 21b and the engine 20.

At time t3, the engine rotational speed Ne reaches the second target Ne. When this is detected at step S6b, the transmission ratio control section 7c is energized at step S7b to start transmission ratio raising control of raising the transmission ratio by PID control based on the difference between the motor rotational speed Nm of the drive motor 21b and the rotational speed Np2 of the driven side power transmission pulley 62.

At time t4, the motor rotational speed Nm of the drive motor 21b and the rotational speed Np2 of the driven side power transmission pulley 62 become equal to each other and the one-way clutch 44 is placed into a connected state. When this is detected at step S8b, at step S9b, the target value of the engine rotational speed in the target Ne follow-up control is changed from the second target value to the first target value. After the engine rotational speed Ne begins to rise, the transmission ratio Rm begins to decrease in response to the rise of the engine rotational speed Ne in order to make the motor rotational speed Nm of the drive motor 21b and the rotational speed Np2 of the driven side power transmission pulley 62 equal to each other.

At time t5, the engine rotational speed Ne reaches the first target Ne. When this is detected at step S10b, normal control is entered at step S11b and the power source is switched over from the drive motor 21b to the engine 20.

Figure 11:
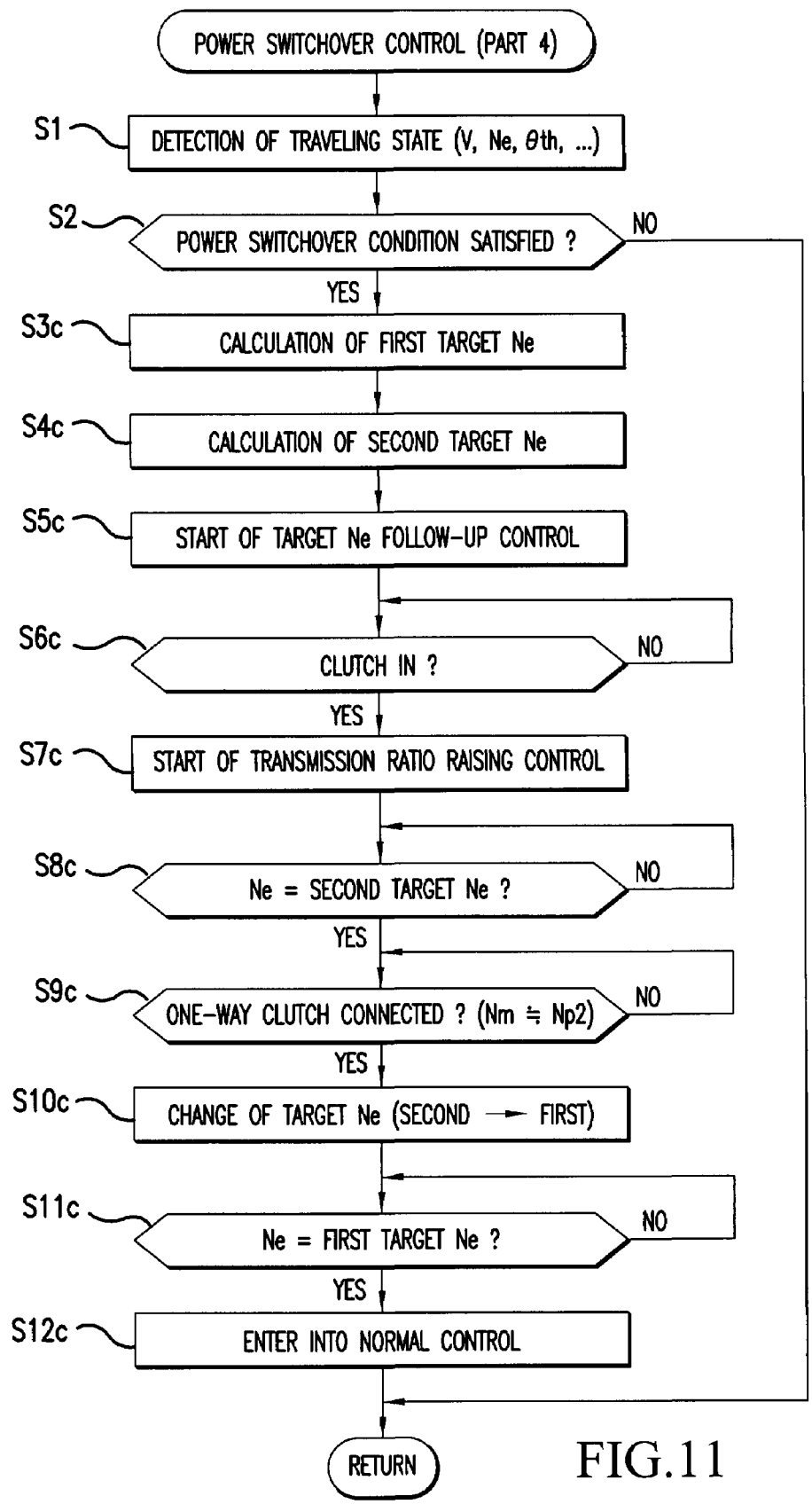
FIG. 11 is a flow chart illustrating a procedure of a fourth embodiment of the power switchover method.

FIG. 11 is a flow chart of a power switchover method according to a fourth embodiment of the present invention, and FIG. 10 is a timing chart of the power switching method.

At step S1, the traveling state of the vehicle is determined based on results of detection of the vehicle speed V, engine rotational speed Ne, throttle opening θth, and so forth. At step S2, it is determined based on the traveling state whether or not a power switchover condition for switching over the power source from the drive motor 21b to the engine 20 is satisfied. If such a power switchover condition is satisfied, that is, the throttle opening θth is higher than a reference opening and the vehicle speed V and the engine rotational speed Ne exhibit an increasing tendency, then the processing advances to step S3c.

At step S3c, a target engine rotational speed (first target Ne) upon power switchover is calculated by the target rotational speed determination section 7a based on the vehicle speed V and the throttle opening θth at present. At step S4c, a second target value a little lower than the first target Ne is calculated based on the vehicle speed V and the throttle opening θth at present similarly. At step S5c, the engine rotational speed control section 7b is energized to start target Ne follow-up control of increasing or decreasing the throttle opening θth independently of the throttle operation by means of the DBW system 12 to raise the engine rotational speed to the second target Ne. For the follow-up control, PID control is adopted.

Figure 12:
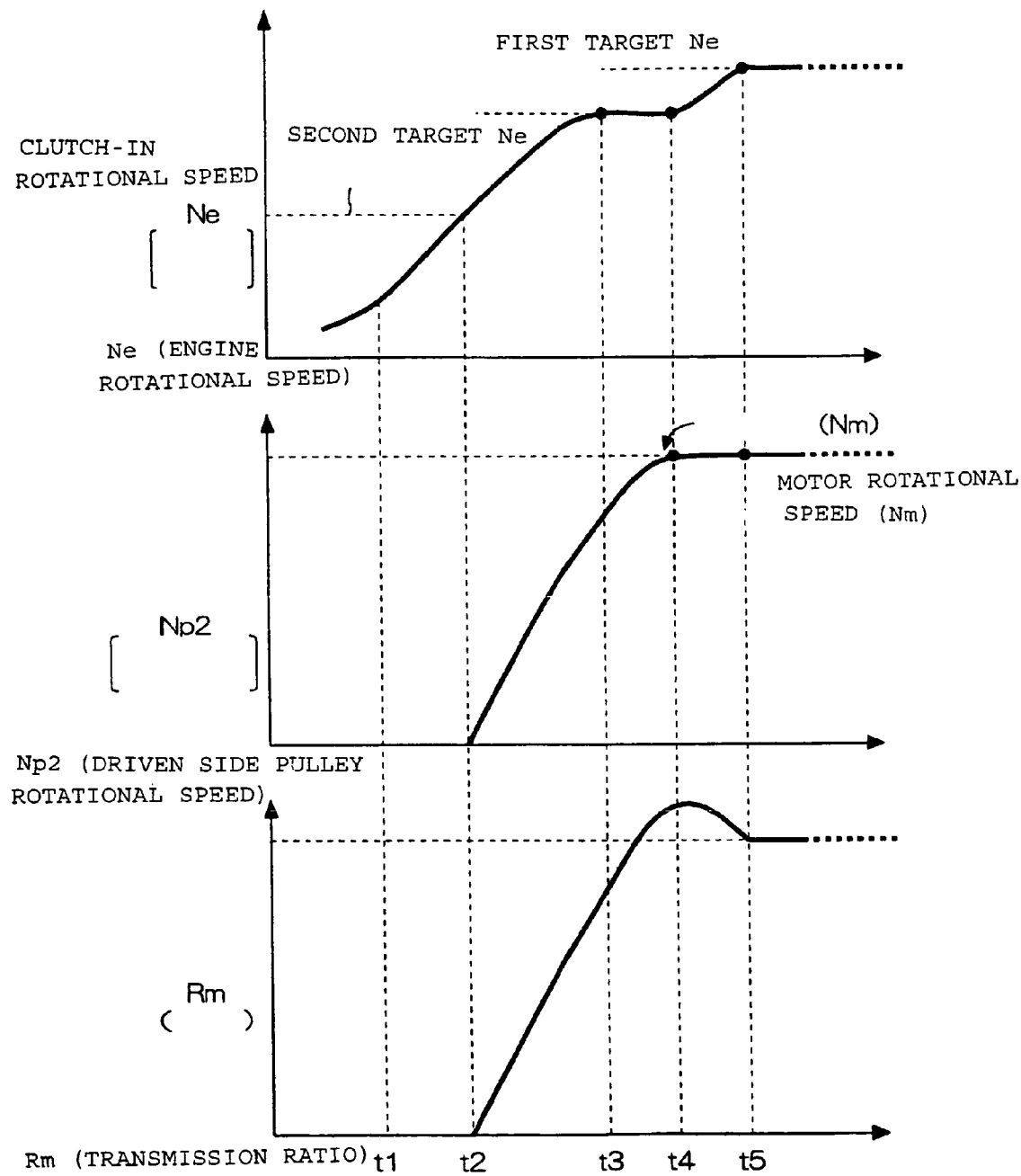
FIG. 12 is a timing chart of the fourth embodiment of the power switchover method.

If the target Ne follow-up control is started at time t1 of FIG. 12 and the engine rotational speed reaches a connection speed of the starter clutch 40 at time t2, then the input power shaft (driving side power transmission pulley 58) of the continuously variable transmission 23 starts rotation. In addition, the rotational speed of the output power shaft (driven side pulley 62) begins to gradually rise in response to the starting of rotation. However, at this point of time, the rotational speed Np2 of the driven side power transmission pulley 62 is lower than the motor rotational speed Nm of the drive motor 21b and the one-way clutch 44 is in an idling state. Therefore, the power is not transmitted between the drive motor 21b and the engine 20.

When the clutch-in of the starter clutch 40 is detected at step S6c, the transmission ratio control section 7c is energized at step S7c to start transmission ratio raising control of raising the transmission ratio by PID control based on the difference between the motor rotational speed Nm of the drive motor 21b and the rotational speed Np2 of the driven side power transmission pulley 62. At time t3, the engine rotational speed Ne reaches the second target Ne. If this is detected at step S8c, then at step S9c, it is decided based on the motor rotational speed Nm of the drive motor 21b and the rotational speed Np2 of the driven side power transmission pulley 62 whether or not the one-way clutch 44 is connected.

At time t4, the motor rotational speed Nm of the drive motor 21b and the rotational speed Np2 of the driven side power transmission pulley 62 become equal to each other and the one-way clutch 44 is placed into a connected state. When this is detected at step S9c, at step S10c, the target value of the engine rotational speed in the target Ne follow-up control is changed from the second target value to the first target value. After the engine rotational speed Ne begins to rise, the transmission ratio Rm begins to decrease in response to the rise of the engine rotational speed Ne in order to make the motor rotational speed Nm of the drive motor 21b and the rotational speed Np2 of the driven side power transmission pulley 62 equal to each other.

At time t5, the engine rotational speed Ne reaches the first target Ne. When this is detected at step S11c, normal control is entered at step S12c and the power source is switched over from the drive motor 21b to the engine 20.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power switchover apparatus for a hybrid vehicle, the hybrid vehicle including a starting clutch provided between a crankshaft of an engine and an automatic transmission, a one-way clutch interposed between the automatic transmission and a drive shaft, and a drive motor connected to the drive shaft, wherein, upon starting, the one-way clutch is controlled to idle using the motor as a power source, and thereafter, the one-way clutch is connected to switch over the power source to the engine, said power switchover apparatus for a hybrid vehicle comprising:

target rotational speed setting means for setting a target rotational speed of the engine when the power source is to be switched over from the motor to the engine; and control means for controlling the engine rotational speed and the transmission ratio of the automatic transmission in response to the target rotational speed, said control means including:

means for controlling the engine rotational speed to follow up the target rotational speed; and means for controlling the transmission ratio of the automatic transmission to rise until the power of the engine is transmitted to the drive shaft while the engine rotational speed remains following up the target rotational speed.

2. The power switchover apparatus for a hybrid vehicle according to claim 1, wherein said target rotational speed setting means sets a first target rotational speed of the engine to be used when the power source is to be switched over from the motor to the engine and a second target rotational speed lower than the first target rotational speed, and said control means controls the engine rotational speed to follow up the second target rotational speed, controls the transmission ratio of the automatic transmission to rise until the power of the engine is transmitted to the drive shaft while said control means controls the engine rotational speed to remain following up the second target rotational speed, and controls the transmission ratio of the automatic transmission so that, after the power of the engine is transmitted to the drive shaft, the engine rotational speed is controlled to follow up the first target value, and the rotational speed of the drive shaft is kept fixed irrespective of the rise of the engine rotational speed.

3. The power switchover apparatus for a hybrid vehicle according to claim 2, wherein said means for raising the transmission ratio of the automatic transmission causes the transmission ratio to be raised after the one-way clutch is placed into a connected state.

4. The power switchover apparatus for a hybrid vehicle according to claim 3, wherein said means for raising the transmission ratio of the automatic transmission decides disconnection or connection of the one-way clutch based on a difference in rotational speed between an output power shaft of the automatic transmission and the drive shaft.

5. The power switchover apparatus for a hybrid vehicle according to claim 2, wherein said means for raising the transmission ratio of the automatic transmission starts to raise the transmission ratio when the starting clutch is connected.

6. The power switchover apparatus for a hybrid vehicle according to claim 2, wherein said means for raising the transmission ratio of the automatic transmission starts to raise the transmission ratio when the engine rotational speed reaches the second target rotational speed.

7. The power switchover apparatus for a hybrid vehicle according to claim 1, wherein said means for raising the transmission ratio of the automatic transmission causes the transmission ratio to be raised after the one-way clutch is placed into a connected state.

8. The power switchover apparatus for a hybrid vehicle according to claim 7, wherein said means for raising the transmission ratio of the automatic transmission decides disconnection or connection of the one-way clutch based on a difference in rotational speed between an output power shaft of the automatic transmission and the drive shaft.

9. The power switchover apparatus for a hybrid vehicle according to claim 1, wherein said means for raising the transmission ratio of the automatic transmission starts to raise the transmission ratio when the engine rotational speed reaches the target rotational speed.

10. The power switchover apparatus for a hybrid vehicle according to claim 1, wherein said means for raising the transmission ratio of the automatic transmission starts to raise the transmission ratio when the starting clutch is connected.

11. A power switchover apparatus for a hybrid vehicle, comprising:

a target rotational speed setting device, said target rotational speed setting device setting a target rotational speed of an engine when a power source of the hybrid vehicle is to be switched over from a motor to the engine; and a control, said control controlling a rotational speed of the engine and a transmission ratio of an automatic transmission in response to the target rotational speed, controlling the engine rotational speed to follow up the target rotational speed and controlling the transmission ratio of the automatic transmission to rise until the power of the engine is transmitted to a drive shaft while the engine rotational speed remains following up the target rotational speed.

12. The power switchover apparatus for a hybrid vehicle according to claim 11, wherein said target rotational speed setting device sets a first target rotational speed of the engine to be used when the power source is to be switched over from the motor to the engine and a second target rotational speed lower than the first target rotational speed, and said control controls the engine rotational speed to follow up the second target rotational speed, controls the transmission ratio of the automatic transmission to rise until the power of the engine is transmitted to the drive shaft while said control controls the engine rotational speed to remain following up the second target rotational speed, and controls the transmission ratio of the automatic transmission so that, after the power of the engine is transmitted to the drive shaft, the engine rotational speed is controlled to follow up the first target value, and the rotational speed of the drive shaft is kept fixed irrespective of the rise of the engine rotational speed.

13. The power switchover apparatus for a hybrid vehicle according to claim 12, wherein said control, that controls the transmission ratio of the automatic transmission to rise, causes the transmission ratio to be raised after a one-way clutch is placed into a connected state.

14. The power switchover apparatus for a hybrid vehicle according to claim 13, wherein said control, that controls the transmission ratio of the automatic transmission to rise, decides disconnection or connection of the one-way clutch based on a difference in rotational speed between an output power shaft of the automatic transmission and the drive shaft.

15. The power switchover apparatus for a hybrid vehicle according to claim 12, wherein said control, that controls the transmission ratio of the automatic transmission to rise, starts to raise the transmission ratio when a starting clutch is connected.

16. The power switchover apparatus for a hybrid vehicle according to claim 12, wherein said control, that controls the transmission ratio of the automatic transmission to rise, starts to raise the transmission ratio when the engine rotational speed reaches the second target rotational speed.

17. The power switchover apparatus for a hybrid vehicle according to claim 11, wherein said control, that controls the transmission ratio of the automatic transmission to rise, causes the transmission ratio to be raised after a one-way clutch is placed into a connected state.

18. The power switchover apparatus for a hybrid vehicle according to claim 17, wherein said control, that controls the transmission ratio of the automatic transmission to rise, decides disconnection or connection of the one-way clutch based on a difference in rotational speed between an output power shaft of the automatic transmission and the drive shaft.

19. The power switchover apparatus for a hybrid vehicle according to claim 11, wherein said control, that controls the transmission ratio of the automatic transmission to rise, starts to raise the transmission ratio when the engine rotational speed reaches the target rotational speed.

20. The power switchover apparatus for a hybrid vehicle according to claim 11, wherein said control, that controls the transmission ratio of the automatic transmission to rise, starts to raise the transmission ratio when a starting clutch is connected.

* * * * *